US006181937B1

(12) United States Patent
Joensuu

(10) Patent No.: US 6,181,937 B1
(45) Date of Patent: Jan. 30, 2001

(54) METHOD FOR AVOIDING UNNECESSARY SIGNALLING IN A CELLULAR COMMUNICATIONS SYSTEM

(76) Inventor: Erkki Joensuu, Kiertotie 8, FIN-02580 Siuntio (FI)

( * ) Notice: Under 35 U.S.C. 154(b), the term of this patent shall be extended for 0 days.

(21) Appl. No.: 09/108,398

(22) Filed: Jul. 1, 1998

(51) Int. Cl.[7] .................................................. H04Q 7/20
(52) U.S. Cl. ...................... 455/433; 455/432; 455/435; 455/436; 455/439; 455/445; 455/456
(58) Field of Search .................................. 455/432, 433, 455/435, 458, 445, 434, 436, 437, 438, 439, 440, 456

(56) References Cited

U.S. PATENT DOCUMENTS

| 5,123,111 | 6/1992 | Delory et al. ........................ 455/34.1 |
| 5,479,481 | 12/1995 | Koivunen ................................ 379/59 |
| 5,490,201 | 2/1996 | Moberg et al. .......................... 379/58 |
| 5,561,840 | 10/1996 | Alvesalo et al. ..................... 455/33.1 |
| 5,561,854 | 10/1996 | Antic et al. .......................... 455/56.1 |
| 5,713,073 | 1/1998 | Warsta ................................ 455/56.1 |
| 5,721,918 | 2/1998 | NIlsson et al. ....................... 395/618 |
| 5,867,784 | * 2/1999 | Lantto .................................. 455/432 |
| 5,901,353 | * 5/1999 | Pentikainen .......................... 455/433 |
| 5,933,590 | * 8/1999 | Allen ................................... 370/218 |
| 6,018,573 | * 1/2000 | Tanaka ................................ 379/211 |

FOREIGN PATENT DOCUMENTS

| WO 93/20524 | 10/1993 | (WO) . |
| WO 93/21715 | 10/1993 | (WO) . |
| WO 94/04006 | 2/1994 | (WO) . |
| WO 96/29838 | 9/1996 | (WO) . |

OTHER PUBLICATIONS

Standard Search Report for RS 101376 US Completed on Mar. 16, 1999, EPX.
Gustafsson, Niklas, *Mobile Network Overload Performance & Regulation,* An Analytical and Simulation Study in CMS 30; Master Thesis, Department of Information Technology at Mid Sweden University (Sundsvall), Jan. 16, 1998, pp. 1–76.

* cited by examiner

*Primary Examiner*—Daniel S. Hunter
*Assistant Examiner*—Yemane Woldetatios
(74) *Attorney, Agent, or Firm*—Jenkens & Gilchrist, A Professional Corporation

(57) ABSTRACT

A method for avoiding unnecessary signalling in a cellular system is disclosed whereby a "VMSC data generation" or similar field of information can be utilized in an HLR queue. When the HLR is storing Location Erasure data in the queue, the HLR can also store the most current "VMSC data generation" field together with the Location Erasure data in the queue. Prior to sending a Location Erasure message to a VMSC from the HLR's queue, the HLR determines whether the current "VMSC data generation" field is different than the one stored in the queue. If so, the HLR can discard the Location Erasure data in the queue, and thus defer from sending the Location Erasure message to that VMSC. Alternatively, when the HLR notes a new "VMSC data generation" field, the HLR scans the complete queue and discards all Location Erasure messages associated with an older "VMSC data generation" field than the current one noted by the HLR.

20 Claims, 2 Drawing Sheets

METHOD FOR AVOIDING UNNECESSARY SIGNALLING IN A CELLULAR COMMUNICATIONS SYSTEM

BACKGROUND OF THE INVENTION

1. Technical Field of the Invention

The present invention relates in general to the mobile telephony field and, in particular, to a method for avoiding unnecessary signalling in a cellular communications system.

2. Description of Related Art

In certain cellular communications systems, such as for example, the Personal Digital Cellular (PDC) System in Japan, and the Pan-European Global System for Mobile Communications (GSM), selected information associated with mobile subscribers is stored at a switching node, such as for example, a PDC System's Visited Mobile Services Switching Center (VMSC), or a GSM's visited MSC/Visitor Location Register (MSC/VLR). In the GSM, the MSC and VLR are physically integrated but their functions are logically separate. A VMSC (or MSC/VLR) is typically responsible for setting up and terminating calls between system users and/or subscribers, and providing switching and location management functions for the subscribers' MSs located within the VMSC's service area.

For location management purposes, a VMSC maintains information in a database (typically in an associated Global Location Register or GLR) about all of the mobile subscribers currently located within that VMSC's service area. Notably, the same function is performed by a VLR in the GSM. Essentially, the VMSC maintains a copy of a portion of the mobile subscriber data stored in the Home Location Register (HLR) for all of the subscribers located within that VMSC's service area. As such, both the HLR and VMSC store location information for the subscribers located in that VMSC's service area.

In such cellular systems as the PDC System and GSM, a Public Land Mobile Network (PLMN) network portion typically includes several VMSCs (or MSC/VLRs). For example, FIG. 1 is a simplified block diagram of an exemplary cellular system 100. Notably, FIG. 1 can represent a PDC System, but it can also represent a GSM, Digital-Advanced Mobile Phone System (D-AMPS), or any other similar type of cellular system including an HLR or similarly functioning node. Although the cellular system 100 illustrated by FIG. 1 shows only two VMSCs (106, 108), it may be assumed that the system (100) can also include up to several other similarly-arranged VMSCs. System 100 also includes a Gateway MSC (GMSC) 102, which functions as a link between a PDC PLMN network and another PLMN, Public Switched Telephone Network (PSTN), and/or Integrated Services Digital Network (ISDN) network.

Notably, the radio network coverage areas of the VMSCs (e.g., 106, 108) overlap to a certain extent at their mutual border (e.g., near the border between Location Areas 1 and 2). Such an overlap of radio coverage is normal and in accordance with existing cellular system standards. However, a significant problem arises due to such radio network coverage overlap between neighboring VMSCs.

For example, a VMSC (e.g., 106) can experience a major hardware and/or software failure, and its radio network (e.g., control channel) may be temporarily turned off as a result. Additionally, certain failures can affect the VMSC's database so that some or all of the stored mobile subscriber data is lost. At the onset of a VMSC failure, all of the MSs powered on in that VMSC's radio network border area (e.g., near the border in Location Area 1) that can "hear" a neighboring VMSC's (e.g., 108) base station transmissions, will attempt to re-register and update their locations with that "live" VMSC (108). In a PDC or GSM network, the MSs typically conduct a Location Registration (location updating procedure) with the new VMSC (108). Usually, these MS Location Registrations with a new VMSC all occur within a relatively short period of time (e.g., only a few seconds).

Nevertheless, there can be tens of thousands of MSs powered on in congested urban areas near the border of the radio network coverage area for the failed VMSC (e.g., thousands of hand-held phones awaiting a page or engaged in a call in the Tokyo metropolitan area). Consequently, at the onset of the VMSC's failure (e.g., loss of the control channel), these thousands of MSs can send a location updating request (Location Registration) to a "live" neighboring VMSC (108, etc.) As such, each MS establishes a radio connection with, and then transmits a Location Updating Request message to, the "live" neighboring VMSC. Primarily, this message contains information needed to identify the MS's subscriber.

In a PDC system, when the "live" VMSC receives the Location Updating Request message, it checks the Mobile Station Identity (MSI) field in the message to determine whether that MS is registered with that VMSC (i.e., the MS has a record with subscriber data maintained at that VMSC) If the MS is "new" and not registered with that VMSC, then the VMSC initiates a location updating procedure with the HLR (104).

The VMSC (108) invokes the location updating procedure with the HLR (104) for each "new" MS, and sends the MSI and Pursuit Routing Number (PRN) associated with each such MS to the HLR. This information is conveyed from the VMSC to the HLR via the CCITT Common Channel Signalling System No. 7 (CC7) network signalling links in the PDC, or from the MSC/VLR to the HLR via the CCITT Signalling System No. 7 (SS7) network signalling links in the GSM.

A significant problem related to this location management approach is that since the Location Registration procedure can be invoked between the "live" VMSCs and the HLR for thousands of MSs, the HLR will receive a mass of location registration update messages over the CC7 (SS7) signalling links. Under normal conditions, if the original VMSC (106) had been operational, then the HLR would have sent a "Location Erasure" message to that VMSC to erase the old location information stored for the MSs concerned. This message is called a "Location Cancellation Message" in the GSM. However, since the original VMSC (106) has failed, the signalling connection between it and the HLR is inoperative. Consequently, the HLR has to store the Location Erasure information for all of the MSs involved in a queue, and as soon as the operation of the original VMSC (106) and signalling links is restored, send the pending mass of Location Erasure messages over the signalling links to that VMSC. Note that a signalling link failure can also occur for a number of reasons other than a VMSC's failure (e.g., a temporary failure of the signalling link itself). Consequently, it is necessary to be capable of buffering the Location Erasure messages at least temporarily in the HLR.

An existing approach used is to queue the pending Location Erasure messages in a buffer location in the HLR. Then, as the "failed" VMSC and signalling links are returned to service (e.g, operation of the original control channel is restored), the HLR transmits the pending Location Erasure messages to that VMSC. In response, the VMSC transmits a Location Erasure Acknowledgment message back to the HLR. Albeit, this solution is deemed practical and relatively easy to implement for relatively small network applications. However, for much larger applications (e.g., a cellular network in a congested metropolitan area such as Tokyo), the existing approach results in a mass of Location Erasure messages and Location Erasure Acknowledgment messages being sent via the (CC7/SS7) signalling network between the HLR and VMSC during a relatively short period of time (if the failed VMSC has lost its mobile subscriber data). More importantly, this mass message signalling ties up the VMSC's and signalling network's valuable processing resources, especially when the VMSC needs them the most (i.e., while the VMSC is attempting to recover from its serious failure). Nevertheless, as described in detail below, the present invention successfully resolves these and other related problems.

SUMMARY OF THE INVENTION

In accordance with the present invention, a method and system for avoiding unnecessary mass signalling in a cellular system is provided by utilizing a "VMSC data generation" field or similar field in the HLR queue. When the HLR stores Location Erasure data in the queue, the HLR can also store the current "VMSC data generation" field together with the Location Erasure data in the queue. In one embodiment of the present invention, prior to sending a Location Erasure message to a VMSC from the HLR's queue, the HLR determines whether the current "VMSC data generation" field is "newer" than the one stored in the queue. If so, the HLR can discard the Location Erasure data in the queue, and thus defer from sending the Location Erasure message to that VMSC. In another embodiment, when the HLR notes a new "VMSC data generation" field, the HLR scans the complete queue and discards all Location Erasure messages associated with an older "VMSC data generation" field than the current one noted by the HLR.

An important technical advantage of the present invention is that unnecessary mass signalling between an HLR and VMSC (or MSC/VLR) can be avoided.

Another important technical advantage of the present invention is that the use of valuable VMSC (or MSC/VLR) resources can be minimized, especially while the VMSC is recovering from a serious failure.

Yet another important technical advantage of the present invention is that the use of valuable signalling network resources between an HLR and VMSC (or MSC/VLR) can be minimized, especially while the VMSC is recovering from a serious failure.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
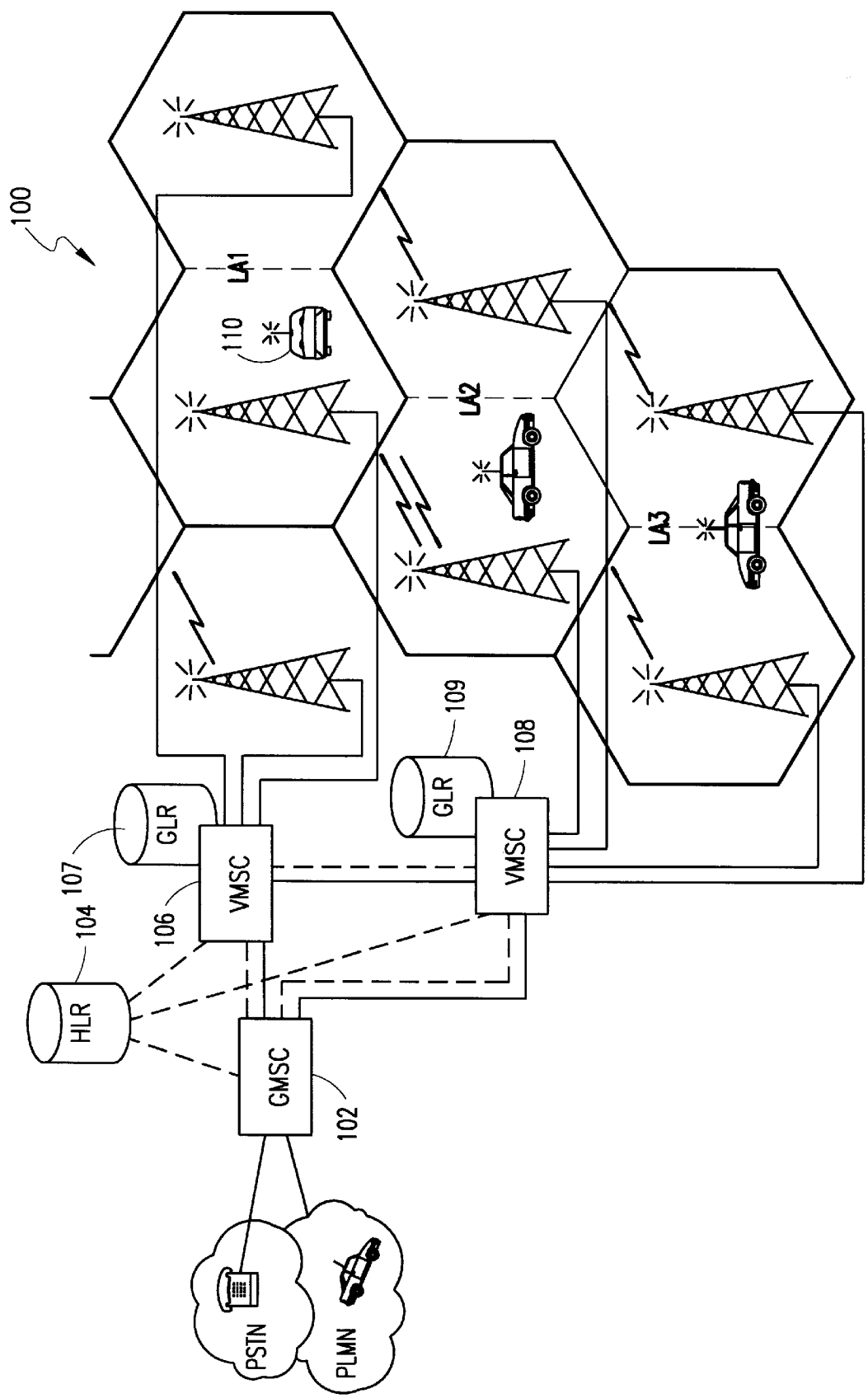
FIG. 1 is a simplified block diagram of an exemplary cellular system.
Figure 2:
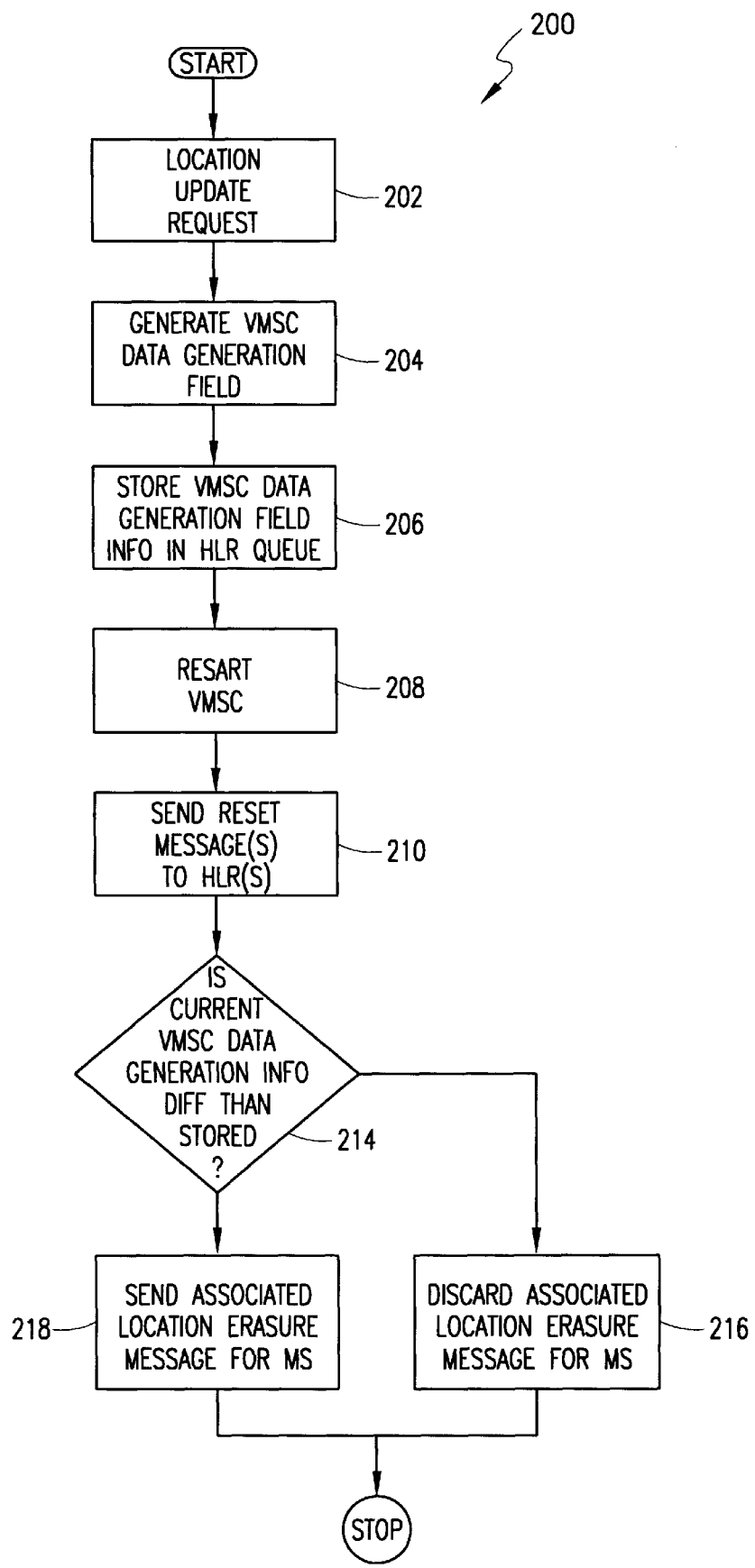
FIG. 2 is a flow diagram of an exemplary method that can be used to implement a preferred embodiment of the present invention.

The preferred embodiment of the present invention and its advantages are best understood by referring to FIGS. 1–2 of the drawings, like numerals being used for like and corresponding parts of the various drawings.

Essentially, a method and system for use in avoiding unnecessary mass signalling to and from an HLR in a cellular system are provided by utilizing a "VMSC data generation" field or similar field in the HLR queue. When the HLR is storing Location Erasure data for MSs in the queue, the HLR can also store a "VMSC data generation" field together with the Location Erasure data in the queue. In one embodiment of the present invention, prior to sending a Location Erasure message for an MS to a VMSC from the HLR's queue, the HLR determines whether the current "VMSC data generation" field is newer than the one stored in the queue. If so, the HLR can discard the Location Erasure data in the queue, and thus defer from sending that Location Erasure message for that MS to the VMSC. In another embodiment, when the HLR notes a new "VMSC data generation" field, the HLR scans the complete queue and discards all Location Erasure messages associated with an older "VMSC data generation" field than the current one noted by the HLR.

Specifically, FIG. 2 is a flow diagram that illustrates an exemplary method (200) that can be used for avoiding unnecessary mass signalling in a cellular communications system, in accordance with a preferred embodiment of the present invention. For example, the method 200 shown in FIG. 2 can be implemented in the PDC system 100 shown in FIG. 1, or any other appropriate cellular system utilizing an HLR, VMSC and/or similarly functioning network nodes.

At step 202 of the exemplary method, a VMSC data generation field can be generated for each location update request made for an MS from a VMSC (e.g., 106) to the HLR 104. For example, if an MS (e.g., MS 110) moves from one cell to another (e.g., a cell in location area 2 to a cell in location area 1), the "new" VMSC 106 transmits a location updating request message to inform the HLR 104. In return, the HLR 104 informs the "old" VMSC 108 of the change with a location erasure message. As such, at step 204, a VMSC data generation field can be generated for each such MS location update request made from the VMSC 106 to the HLR 104. The VMSC data generation field can contain, for example, explicit or implicit VMSC identity information. The VMSC identity information may be, for example, the E.164 address of the VMSC involved (i.e., phone number, or Global Title as used for CC7 SCCP addressing).

A VMSC data generation field can be generated in a number of ways. For example, the VMSC data generation field can be conveyed from the VMSC 106 to the HLR 104 by embedding pertinent information about the MS involved in a field in the Location Registration or Restoration message to be sent to the HLR. In the PDC, such a VMSC data generation updating request from a VMSC to an HLR can be conveyed in a CC7 Mobile Application Part/Transaction Capabilities Application Part (MAP/TCAP) Location Registration message, or in a Restoration message (likewise, in the GSM, in a Location Updating message or a Reset message). As such, the "VMSC data generation" information can be a field of arbitrarily selected data that represents the current status of the MS or subscriber involved at the time of the location update request (preferably in addition to a field containing explicit or implicit VMSC ID information). The data in this status field thus changes whenever the location status information is to be changed in the HLR for the MS or subscriber involved. Alternatively, in a PDC system, the VMSC data generation field associated with a MS or subscriber can be conveyed to the HLR in a CC7 MAP/TCAP message (or MAP/D message in the GSM)

separate from a location updating request message. For example, a VMSC data generation field for an MS (or plurality of MSs) can be conveyed from a VMSC (106) to an HLR (104) on a regular or predetermined basis, or as often as required by a network operator. As another alternative, a VMSC data generation field for an MS (or plurality of MSs) can be generated by an HLR (104) whenever a location updating request message is received from a VMSC. The data included in the field can be a randomly generated number or predetermined number that represents the most current location status of the MS or subscriber (e.g., at the time a location updating request was made by a VMSC).

At step 206, the HLR 104 stores each new (most current) VMSC data generation field for an MS (or subscriber) in a local buffer (queue) area, along with Location Erasure information to be sent to the "old" VMSC 106 for that MS. Consequently, the HLR 104 can maintain a most current location status for each MS (or subscriber) with respect to each VMSC (or visited MSC/VLR) (e.g., 106) involved. Notably, in a PDC network, the HLR (e.g., 104) includes a "VMSC file" that contains one data record for each network VMSC. Each data record can contain, for example, the E.164 address for a respective VMSC, in addition to information about the number of subscribers (MSs) that have made a location registration from that VMSC. The VMSC data generation field for a VMSC can be stored in the HLR, for example, in the "VMSC file" for that VMSC.

In the preferred embodiment, at the onset of a restart of the failed VMSC 106 (step 208), the VMSC is first restored to a previously saved state. At step 210, the VMSC 106 then sends a MAP/TCAP (or MAP/D) "reset" message to each HLR (e.g., 104) that the VMSC 106 still carries for any subscriber in its records. Again, the basic function of the VMSC data generation field is to enable the HLR to keep track of the most current location update request for MSs from a VMSC. Consequently, if a VMSC fails, the HLR can compare the VMSC data generation field information for all MSs stored prior to a failure, with the VMSC data generation field generated subsequent to the VMSC being restored. If the comparison shows that the present VMSC data generation field for the MSs is different than the VMSC data generation field stored in the queue (e.g., in the "VMSC file"), the MS location information stored in the queue is considered new for that VMSC, and there is no need to transmit a Location Erasure message to the VMSC 106 for that MS (step 216). Otherwise, if the data in the two VMSC data generation fields matches, then a Location Erasure message can be sent to the VMSC for that MS (step 218).

Alternatively, when a new VMSC data generation field is noted by the HLR 104, the HLR can scan the complete queue and discard all associated Location Erasure messages deemed "older" than the most recent Location Erasure message stored in the HLR.

In summary, in accordance with the present invention, while awaiting restoration of a failed VMSC (or visited MSC/VLR), an HLR can discard all "old" Location Erasure messages in its queue that need not be conveyed to the VMSC once restored. Consequently, the present invention significantly reduces unnecessary mass signalling on the CC7/SS7 network links between the HLR and VMSC, which preserves valuable HLR, VMSC and signalling resources at the time when the VMSC needs them the most (i.e., while attempting to recover from a serious failure).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for avoiding unnecessary signalling between a VMSC and HLR in a cellular communications system, comprising the steps of:

generating a first data field associated with a first location update for a mobile station;

storing said first data field in said HLR;

associating said first data field with location erasure information for said mobile station;

generating a second data field associated with a second location update for said mobile station;

comparing said first data field with said second data field; and if said second data field is different than said first data field, said HLR erasing said location erasure information for said VMSC because no change to a VMSC data field is necessary.

2. The method of claim 1, wherein said first data field comprises a VMSC data generation field.

3. The method of claim 1, wherein said VMSC generates said first data field.

4. The method of claim 1, wherein said HLR generates said first data field.

5. The method of claim 1, wherein said VMSC comprises a visited MSC/VLR.

6. The method of claim 1, wherein said first data field includes randomly selected information.

7. The method of claim 1, wherein said first data field includes predetermined information.

8. The method of claim 1, wherein said first data field is conveyed from said VMSC to said HLR in a MAP/TCAP message.

9. The method of claim 1, wherein said first data field is conveyed from said VMSC to said HLR in a location updating request message.

10. A system for use in avoiding unnecessary signalling in a cellular communications system, comprising:

a home location register;

a plurality of mobile stations; and a visited mobile services switching center coupled by a signalling network to said home location register, said visited mobile services switching center including:

means for generating a first data field associated with a first location update for at least one of said plurality of mobile stations; and said home location register comprising: means for storing said first data field in said home location register;

means for associating said first data field with location erasure information for said at least one of said plurality of mobile stations;

means for receiving a second data field from said visited mobile services switching center, said second data field associated with a second location update for said at least one of said plurality of mobile stations;

means for comparing said first data field with said second data field; and if said second data field is different than said first data field, said home location register including means for erasing said location erasure information for said visited mobile services switching center.

11. The system of claim 10, wherein said first data field comprises a visited mobile services switching center data generation field.

12. The system of claim 10, wherein said visited mobile services switching center generates said first data field.

13. The system of claim 10, wherein said home location register generates said first data field.

14. The system of claim 10, wherein said visited mobile services switching center comprises a visited MSC/VLR.

15. The system of claim 10, wherein said first data field includes randomly selected information.

16. The system of claim 10, wherein said first data field includes predetermined information.

17. The system of claim 10, wherein said first data field is conveyed from said visited mobile services switching center to said home location register in a MAP/TCAP message.

18. The system of claim 10, wherein said first data field is conveyed from said visited mobile services switching center to said home location register in a location updating request message.

19. The system of claim 10, wherein said first data field is conveyed from said visited mobile services switching center to said home location register associated with a restoration message.

20. The system of claim 10, wherein said first data field is conveyed from said visited mobile services switching center to said home location register in a reset message.

* * * * *